US008745387B2

(12) United States Patent
Choudhary et al.

(10) Patent No.: US 8,745,387 B2
(45) Date of Patent: *Jun. 3, 2014

(54) SECURITY MANAGEMENT FOR AN INTEGRATED CONSOLE FOR APPLICATIONS ASSOCIATED WITH MULTIPLE USER REGISTRIES

(75) Inventors: Samar Choudhary, Morrisville, NC (US); Nataraj Nagaratnam, Cary, NC (US); Naveenkumar V. Muguda, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 13/453,543

(22) Filed: Apr. 23, 2012

(65) Prior Publication Data
US 2012/0210419 A1 Aug. 16, 2012

Related U.S. Application Data

(63) Continuation of application No. 11/333,019, filed on Jan. 17, 2006, now Pat. No. 8,261,331.

(51) Int. Cl.
*G06F 7/04* (2006.01)
*H04L 29/08* (2006.01)
*H04L 12/22* (2006.01)

(52) U.S. Cl.
CPC .... *H04L 29/08864* (2013.01); *H04L 29/08765* (2013.01); *H04L 29/08936* (2013.01)
USPC ................ 713/167; 726/28; 726/29; 713/165

(58) Field of Classification Search
None
See application file for complete search history.

(56) References Cited

U.S. PATENT DOCUMENTS

| 5,862,323 | A | 1/1999 | Blakley, III et al. |
| 5,978,568 | A * | 11/1999 | Abraham et al. ............. 709/224 |
| 7,010,600 | B1 | 3/2006 | Prasad et al. |
| 7,013,485 | B2 | 3/2006 | Brown et al. |
| 7,251,732 | B2 * | 7/2007 | Jamieson et al. ............. 713/182 |
| 2002/0143909 | A1 | 10/2002 | Botz et al. |
| 2003/0014521 | A1 | 1/2003 | Elson et al. |
| 2003/0014656 | A1 | 1/2003 | Ault et al. |
| 2003/0105974 | A1 | 6/2003 | Griffin et al. |
| 2003/0107591 | A1 | 6/2003 | Jameson |
| 2003/0177388 | A1 | 9/2003 | Botz et al. |
| 2004/0015596 | A1 | 1/2004 | Sapuram et al. |
| 2004/0078371 | A1 | 4/2004 | Worrell et al. |
| 2004/0117392 | A1 | 6/2004 | Burgmeier |
| 2004/0123152 | A1 | 6/2004 | LeSaint |
| 2004/0168084 | A1 | 8/2004 | Owen et al. |
| 2004/0187031 | A1 | 9/2004 | Liddle |
| 2005/0138411 | A1 | 6/2005 | Griffin et al. |
| 2005/0289644 | A1 | 12/2005 | Wray |

* cited by examiner

*Primary Examiner* — Venkat Perungavoor
(74) *Attorney, Agent, or Firm* — Cuenot, Forsythe & Kim, LLC

(57) ABSTRACT

A system for security management for applications associated with multiple user registries can include an integrated console configured to host a one or more applications or resource objects in corresponding realms. The system also can include one or more roles mapped to different ones of the resource objects and also to different users permitted to access the integrated console. The system yet further can include a user relationship system having associations with multiple different ones of the roles. Finally, the system can include console security management logic programmed to manage authentication for the users using realm of the resource object while not requiring a separate user registry for the integrated console.

20 Claims, 3 Drawing Sheets

SECURITY MANAGEMENT FOR AN INTEGRATED CONSOLE FOR APPLICATIONS ASSOCIATED WITH MULTIPLE USER REGISTRIES

BACKGROUND OF THE INVENTION

1. Field of the Invention

The present invention relates to the cooperative deployment of resource management objects in an integrated solutions console and more particularly to security management for resource management objects in an integrated solutions console.

2. Description of the Related Art

The rapid evolution of technology and the Internet have created an unforgiving consumer. End-users expect e-business to be fast and focused, providing a quick response to service requests. End users further expect dynamic adaptation to meet new computing demands and the provisioning of uninterrupted, round-the-clock access to products and services. Meeting the demands of this unforgiving consumer can require new levels of integration and performance management.

To remain competitive, the enterprise must deploy the appropriate technology to effectively integrate business processes across the enterprise and with key partners, suppliers and customers. The correct infrastructure can enable e-business agility allowing the business to immediately respond to customer demands, market opportunities and security threats. Yet, building and managing an on-demand operating environment can be difficult even for the most skilled technology team. Years of expanding the system architecture to capitalize on new and more advanced technology has created a complex infrastructure. Despite the complexity, though, the demands remain the same: complete and seamless integration of all disparate and similar technologies.

To facilitate the integration and management of multiple, disparate technologies, integrated resource management systems have been deployed to provide a singular view to the enterprise, despite the disparate nature of the resources disposed therein. Through an integrated solutions console, a view of the enterprise can be provided, not only in reference to the performance of individually monitored resources, but also in respect to the administration of security, the authorization of users, the management of service level agreements and the like. Cutting edge implementations of the integrated solutions console demonstrate unparalleled flexibility by providing a portal view to independently developed resource management components.

Generally, console modules disposed within the integrated solutions console can be charged with the management or monitoring of one or more corresponding resources. Referred to in the art as a "resource management object", each resource management object can be rendered within the integrated solutions console to represent an independently developed and self-contained object directed to a specific target platform or resource. Notably, the integration of resource management objects in the integrated services console can provide previously unknown challenges in respect to the identification and verification of console users in respect to the different resource management objects accessed through an integrated services console.

Presently, a myriad of authentication tools have been developed for disparate products operating in disparate platforms. Most permit the replacement of one authentication or authorization solution for another through the implementation of a standard interface. Yet, replacing one authentication solution for another across multiple disparate resources viewable through a single integrated solutions console can require substantial changes to existing authentication and authorization models of administered resources and an associated user interface. For example, conventional solutions allow defining new user registries and mapping the new registries to console resources without accounting for pre-existing user registries. Moreover, a clear demarcation of administrative responsibilities accounting for usage patterns is lacking among conventional solutions.

BRIEF SUMMARY OF THE INVENTION

Embodiments of the present invention address deficiencies of the art in respect to user authentication and authorization in an integrated services console and provide a novel and non-obvious method, system and computer program product for security management in an integrated console for resource objects associated with multiple user registries. A system for security management for resource objects associated with multiple user registries can include an integrated console configured to host one or more resource objects in corresponding realms. The system also can include one or more roles mapped to different ones of the resource objects in different realms and also to different users permitted to access the integrated console. The system yet further can include a user-user mapping of users having associations with multiple different ones of the roles. Finally, the system can include console security management logic programmed to manage authentication for the users according to the user-user mapping.

A method for security management for applications associated with multiple user registries can include mapping a first role to at least one resource object in a first realm and mapping a second role to at least one resource object in a second realm. The method further can include mapping the first role to a user permitted to access an integrated console and mapping the second role to a user permitted to access an integrated console. The users can be equated as a singular user. The equating step can include, for example, writing an entry in a user-user mapping which equates the users as a singular user. Finally, access through an integrated console to the resource objects can be authenticated for the singular user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for security management for applications associated with multiple user registries. In accordance with an embodiment of the present invention, different set of permissions, referred to as roles, can be defined for different resource objects for different applications operating in different security domains referred to as realms. Likewise, different users can be assigned to the different roles so as to secure access to the resource objects through the different applications. Finally, a user-user mapping can be established in coordination with an integrated console to associate a single user having different roles corresponding to different realms for resource objects accessed through the different applications in the integrated console.

Figure 1:
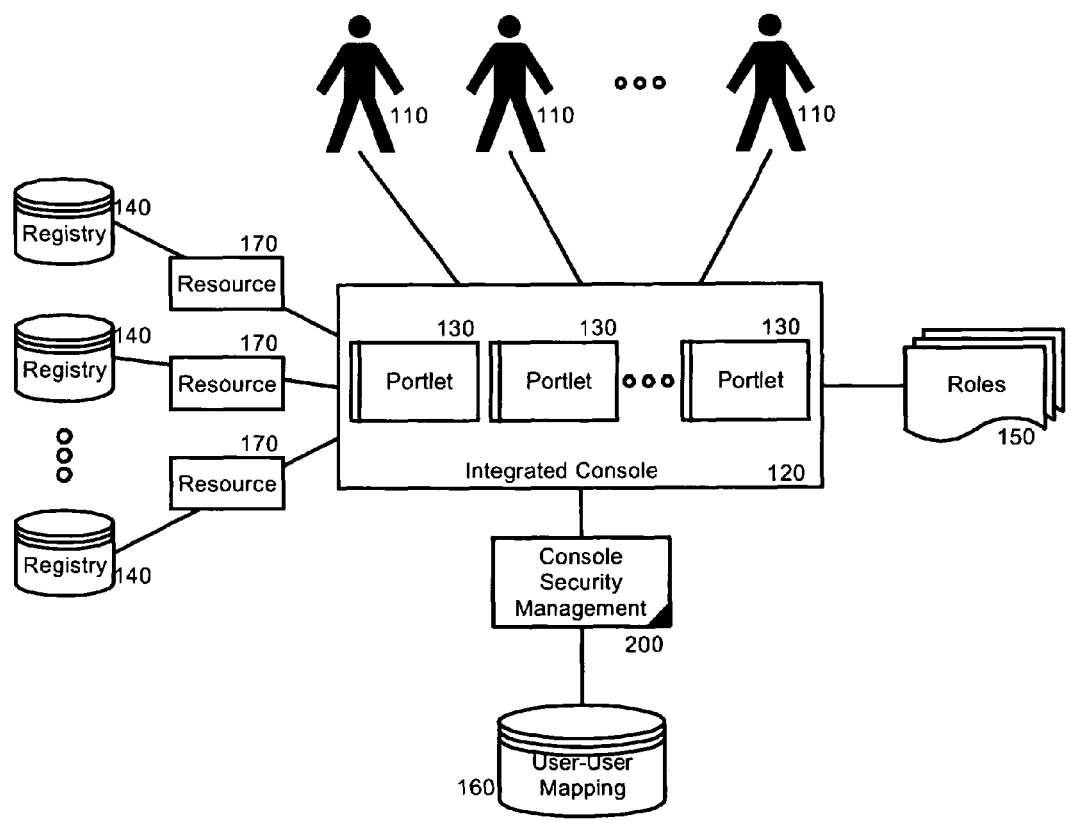
FIG. 1 is a schematic illustration of an integrated console configured for security management for applications associated with multiple user registries; and, FIG. 2 is a flow chart illustrating a process for establishing a set of user-user mappings in the integrated console of FIG. 1; and, FIG. 3 is a flow chart illustrating a process for security management for applications associated with multiple user registries.

In more particular illustration, FIG. 1 is a schematic illustration of an integrated console configured for security management for applications associated with multiple user registries. As shown in FIG. 1, an integrated console 120 can include views to one or more applications 130 accessing one or more resource objects 170. In this regard, each of the applications 130 can be application logic configured to be a portlet within a portal environment hosting the integrated console 120. To that end, users 110 can individually access the applications 130 through the integrated console 120 in a manner limited only by access permissions defined for the applications 130.

Each applications 130 can be associated with a different realm. As such, a registry of access permissions 140 can be defined for each different realm. The registry of access permissions 140 can include access control information specifying access restrictions to different ones of the resource objects 170 for the applications 130 disposed within the realm. A set of roles 150 further can be established which roles 150 can be associated with selected ones of the access permissions 140. The roles can be a logical group of permissions to perform an administrative task in said integrated console. In this regard, users 110 which are assigned to particular ones of the roles 150 are provided with the access permissions 140 associated with the particular ones of the roles 150.

Finally, console security management logic 200 can establish a set of user-user mappings 160 to associate single ones of the users 110 having multiple different roles 150 for multiple different ones of the applications 130 accessing different resource objects 170 across different realms. In this way, an authentication process managed within the console security management logic 200 can be harmonized and simplified within a single location associated with the integration console 120 without requiring the creation of separate, independent registries to be used in lieu of existing registries for the applications 130.

Figure 2:
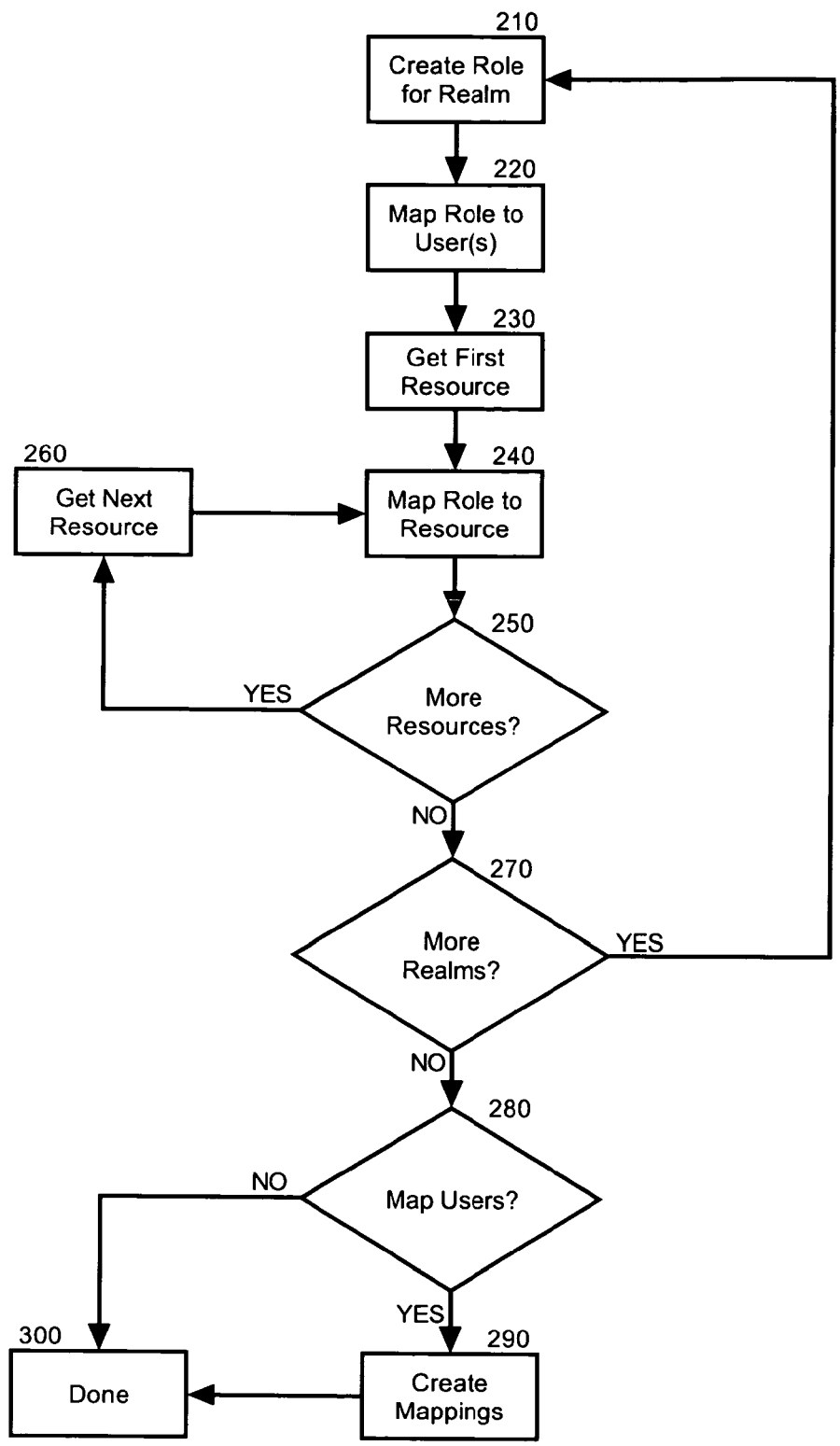

In further illustration, FIG. 2 is a flow chart illustrating a process for establishing a set of user-user mappings in the integrated console of FIG. 1. Beginning in block 210, a role can be created for a realm including one or more resource objects which can be accessed through the integrated console. In block 220, the role can be mapped to one or more users. Subsequently, in block 230 a first resource object in the realm can be selected and in block 240 the role can be mapped to the selected resource object. In decision block 250, if more resource objects are to be mapped to the role, in block 260 a next resource object can be selected and the process can repeat through block 240.

In decision block 270, if additional realms are to be processed, the process can repeat through block 210 for each additional realm. When no additional realms are to be processed, in decision block 280 it can be determined whether one or more of the users who have been assigned to multiple roles are to be mapped together across different realms to be treated as a singular user for purposes of authentication in the integration console.

Alternatively, a super-role can be created to include the multiple roles and an entire hierarchy of roles can be accommodated. Specifically, a third role encompassing both the first and second role can be mapped and a user defined in one realm can be equated with a user defined in another realm as a singular user. Accordingly, the singular user can be mapped to a third role. In any event, if, in decision block 280, multiple roles are to be associated with a single user, in block 290 a mapping can be created for the user for each role association for the user. For example, the mapping can be maintained in the integrated console, or within a portal hosting the integrated console. Subsequently, in block 300 the process can end.

Figure 3:
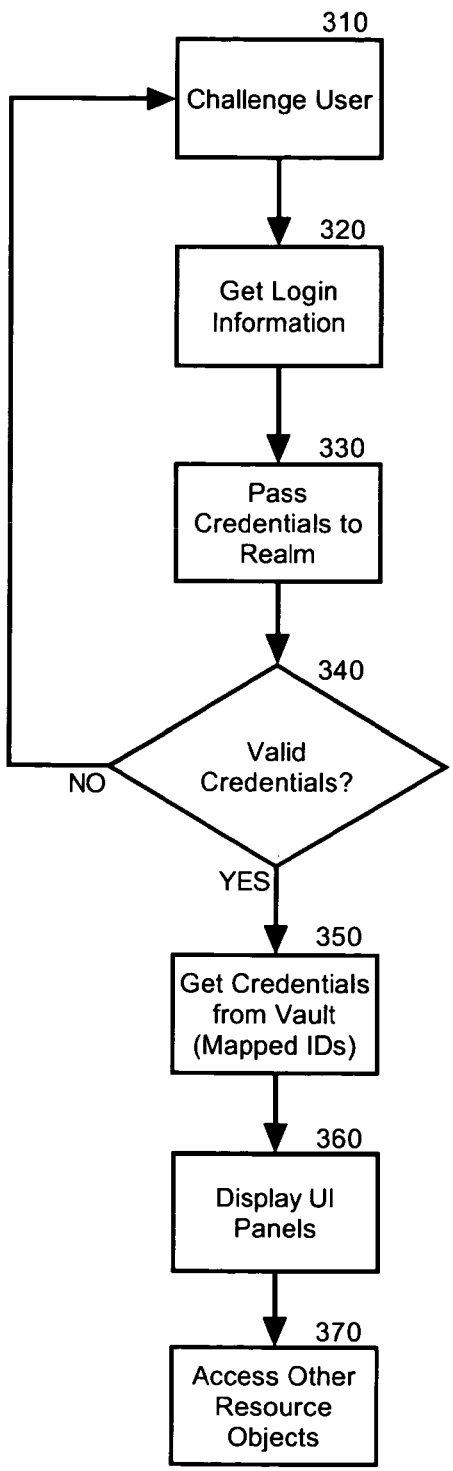

Utilizing the user-user mapping produced in FIG. 2, the console security management process can proactively provide user credentials for applications in the integrated console. Specifically, FIG. 3 is a flow chart illustrating a process for security management for applications associated with multiple user registries. Beginning in block 310, a user of the integrated console can be challenged for authentication and credentials for the user can be obtained in block 320. In block 330, the credentials can be passed to a corresponding realm for an application in the integrated console.

In decision block 340, if the credentials can be validated, the credentials for other applications in the integrated console can be retrieved via the user-user mapping, and the credentials for other applications for the user can be retrieved in block 350. Subsequently, in block 350 the applications can be rendered in the integrated console for the user to access. Notably, the applications can be rendered in the integrated console without requiring the user to separately authenticate in each application, even though the credentials may differ from application to application and realm to realm.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented security management method for applications associated with multiple user registries, comprising:
   mapping a first role to a first resource object in a first realm;
   mapping a second role to a second resource object in a second realm;
   mapping the first role to a first user defined in the first realm;
   mapping the second role to a second user defined in the second realm;
   equating, as a singular user, the first user and the second user; and
   authenticating access, through an integrated console executed by a processor, to the first and second resource objects via the singular user.

2. The method of claim 1, further comprising:
   writing an entry in a user-user mapping that equates the singular user as including the first user and the second user.

3. The method of claim 1, further comprising:
   mapping a third role encompassing both the first role and the second role; and
   mapping the singular user to the third role.

4. The method of claim 1, wherein
   the integrated console is hosted in a portal environment, and
   the resource objects are accessed through the integrated console.

5. The method of claim 1, wherein
   the integrated console has a security realm that is not separate from at least one security realm associated with a corresponding one of the first and second resource objects.

6. The method of claim 1, wherein
   the first user has a role in the first realm that is different a role of the second user in the second realm.

7. The method of claim 1, wherein
   each of the first and second roles includes a logical group of permissions to perform an administrative task on a respective one of the first and second resource objects in the integrated console.

8. A security management computer hardware system for applications associated with multiple user registries, comprising:
   a processor;
   an integrated console executing on the processor and configured to perform:
      mapping a first role to a first resource object in a first realm;
      mapping a second role to a second resource object in a second realm;
      mapping the first role to a first user defined in the first realm;
      mapping the second role to a second user defined in the second realm;
      equating, as a singular user, the first user and the second user; and
      authenticating access to the first and second resource objects via the singular user.

9. The system of claim 8, wherein the integrated console is further configured to perform:
   writing an entry in a user-user mapping that equates the singular user as including the first user and the second user.

10. The system of claim 8, wherein the integrated console is further configured to perform:
    mapping a third role encompassing both the first role and the second role; and
    mapping the singular user to the third role.

11. The system of claim 8, wherein
    the integrated console is hosted in a portal environment, and
    the resource objects are accessed through the integrated console.

12. The system of claim 8, wherein
    the integrated console has a security realm that is not separate from at least one security realm associated with a corresponding one of the first and second resource objects.

13. The system of claim 8, wherein
    the first user has a role in the first realm that is different a role of the second user in the second realm.

14. The system of claim 8, wherein
    each of the first and second roles includes a logical group of permissions to perform an administrative task on a respective one of the first and second resource objects in the integrated console.

15. A computer program product comprising a computer useable storage medium having stored therein computer usable program code for security management for applications associated with multiple user registries, the computer usable program code, which when executed on a computer hardware system, causes the computer hardware system to perform
    mapping a first role to a first resource object in a first realm;
    mapping a second role to a second resource object in a second realm;
    mapping the first role to a first user defined in the first realm;
    mapping the second role to a second user defined in the second realm;
    equating, as a singular user, the first user and the second user; and
    authenticating access, through an integrated console, to the first and second resource objects via the singular user, wherein
    the computer usable storage medium is not a transitory, propagating signal per se.

16. The computer program product of claim 15, wherein the computer usable program code further causes the computer hardware system to perform:

writing an entry in a user-user mapping that equates the singular user as including the first user and the second user.

17. The computer program product of claim 15, wherein the computer usable program code further causes the computer hardware system to perform:

mapping a third role encompassing both the first role and the second role; and mapping the singular user to the third role.

18. The computer program product of claim 15, wherein the integrated console is hosted in a portal environment, and the resource objects are accessed through the integrated console.

19. The computer program product of claim 15, wherein the integrated console has a security realm that is not separate from at least one security realm associated with a corresponding one of the first and second resource objects.

20. The computer program product of claim 15, wherein the first user has a role in the first realm that is different a role of the second user in the second realm.

\* \* \* \* \*